(12) United States Patent
Yang

(10) Patent No.: US 12,455,656 B1
(45) Date of Patent: Oct. 28, 2025

(54) METHOD AND SYSTEM FOR FORCE-AIDED TOUCHPAD NOISE REJECTION

(71) Applicant: Lenovo (Singapore) Pte. Ltd., Singapore (SG)

(72) Inventor: XinMei Yang, Kanagawa (JP)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/783,895

(22) Filed: Jul. 25, 2024

(51) Int. Cl.
*G06F 3/041* (2006.01)
*G06F 3/0354* (2013.01)
*G06F 3/044* (2006.01)

(52) U.S. Cl.
CPC ........ *G06F 3/0418* (2013.01); *G06F 3/03547* (2013.01); *G06F 3/044* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2019/0018544 A1* | 1/2019 | Rosenberg | G06F 3/04186 |
| 2021/0278967 A1* | 9/2021 | Rosenberg | G06F 3/0418 |

* cited by examiner

*Primary Examiner* — Stephen T. Reed
(74) *Attorney, Agent, or Firm* — Osha Bergman Watanabe & Burton LLP (57) ABSTRACT

A touchpad system including a touchpad and a touch controller. The touchpad includes a plurality of force sensors and a touch sensor. The touch controller is in electrical communication with the touchpad and is configured to obtain a touch signal from the touch sensor and determine a signal-to-noise ratio of the touch signal. The touch controller is further configured to determine whether to enter a high noise mode based on the signal-to-noise-ratio of the touch signal. Upon determining to enter the high noise mode, the touch controller is further configured to obtain a force signal from the plurality of force sensors, determine a weighting of the touch signal and force signal based on the signal-to-noise ratio of the touch sensor, aggregate the touch signal and force signal based on the weighting, and determine a contact position of a user touch on the touchpad using the aggregated touch and force signals.

17 Claims, 5 Drawing Sheets

METHOD AND SYSTEM FOR FORCE-AIDED TOUCHPAD NOISE REJECTION

BACKGROUND

A touchpad is used to sense a touch of a user. The user touch is determined based on a touch signal of the touch pad. A contact position indicates the placement of the determined touch on the touchpad. For example, a contact position can contain two coordinates representing the location of the sensed touch along a first and a second reference axes of the touchpad, respectively. A determined touch and associated contact position can be used to control aspects of other systems, such as a cursor of a computer system.

In some instances, the touch signal is plagued with noise. Conventionally, in high noise scenarios, a touch signal is evaluated or processed over a longer period to distinguish a user touch from noise in the touch signal. A consequence of such conventional techniques is that the determined touch, or contact position representation, can be erroneously intermittent resulting in, for example, cursor lag or cursor jump when used to control the cursor of a computer system. Accordingly, there exists a need to accurately determine the contact position of an actual user touch in high noise scenarios without evaluating the touch signal over relatively long periods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate a touchpad system including a touchpad and a touch controller. The touchpad includes a plurality of force sensors and a touch sensor. The touch controller is in electrical communication with the touchpad and is configured to obtain a touch signal from the touch sensor and determine a signal-to-noise ratio of the touch signal. The touch controller is further configured to determine whether to enter a high noise mode based on the signal-to-noise-ratio of the touch signal, and upon determining to enter the high noise mode, enter the high noise mode. While in the high noise mode, the touch controller is further configured to obtain a force signal from the plurality of force sensors and determine a weighting of the touch signal and force signal based on the signal-to-noise ratio of the touch sensor. While in the high noise mode, the touch controller is further configured to aggregate the touch signal and force signal based on the weighting, determine a contact position of a user touch on the touchpad using the aggregated touch and force signals. The touch controller is further configured to transmit the contact position to a computer system.

In general, in one aspect, embodiments relate to a method for determining a contact position on a touchpad. The method includes obtaining a touch signal from a touch sensor of the touchpad and determining a signal-to-noise ratio of the touch signal. The method further includes determining whether to enter a high noise mode based on the signal-to-noise-ratio of the touch signal. Upon determining to enter the high noise mode, the method further includes obtaining a force signal from a plurality of force sensors of the touchpad, determining a weighting of the touch signal and force signal based on the signal-to-noise ratio of the touch sensor, aggregating the touch signal and force signal based on the weighting, and determining the contact position on the touchpad using the aggregated touch and force signals.

In general, in one aspect, embodiments relate to a computer system including a touchpad and a non-transitory computer-readable medium. The touchpad includes a plurality of force sensors and a touch sensor. The non-transitory computer-readable medium includes computer-executable instructions that, when executed on a computer processor, cause the processor to perform the following steps. The steps include obtaining a touch signal from the touch sensor, determining a signal-to-noise ratio of the touch signal, and determining whether to enter a high noise mode based on the signal-to-noise ratio of the touch signal. Upon determining to enter the high noise mode, the steps further include obtaining a force signal from the plurality of force sensors, determining a weighting of the touch signal and force signal based on the signal-to-noise ratio of the touch sensor, aggregating the touch signal and force signal based on the weighting, and determining a contact position of a user touch on the touchpad using the aggregated touch and force signals. The steps further include manipulating a cursor of the computer system based on the contact position.

DETAILED DESCRIPTION

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Embodiments disclosed herein generally relate to a touchpad system that can accurately and quickly (e.g., in real time) detect a touch of a user and the location of that touch on the touchpad, even in the presence of relatively high noise. Conventionally, a touchpad consists of a touch sensor that outputs a touch signal and the touch signal is evaluated to determine the presence and location of a touch. In high noise scenarios, conventional techniques require the aggregation (e.g., averaging) of the touch signal over a period to reduce the noise in the touch signal. A disadvantage of these techniques is that they can fail to capture spatially transient signals, for example, originating from the motion of a user's touch or are prohibitively slow. This can negatively affect other processes reliant on, or based on, the touch signal. For example, and as described below, a touchpad can be used to control a cursor of a computer system. In instances where a user's touch cannot be accurately determined or requires the accumulation of multiple frames, the cursor can be observed to lag, jump, or display other erroneous behavior. In contrast, embodiments disclosed herein determine whether a high noise scenario is present and, if so, acquire and use a force signal from a plurality of force sensors included in the touchpad, in addition to the touch signal, to determine a contact position (i.e., presence and location of a touch).

Figure 1:
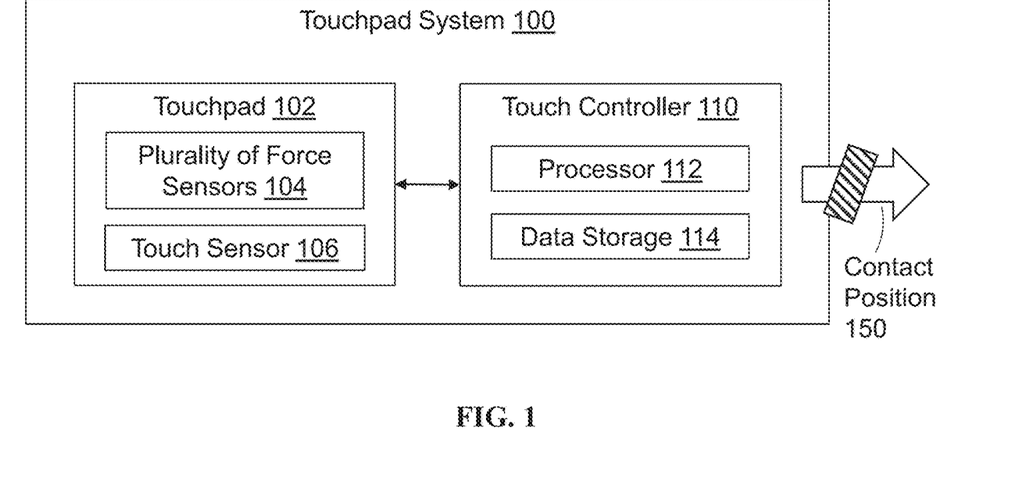
FIG. 1 depicts a touchpad system in accordance with one or more embodiments of the disclosure.
Figure 2:
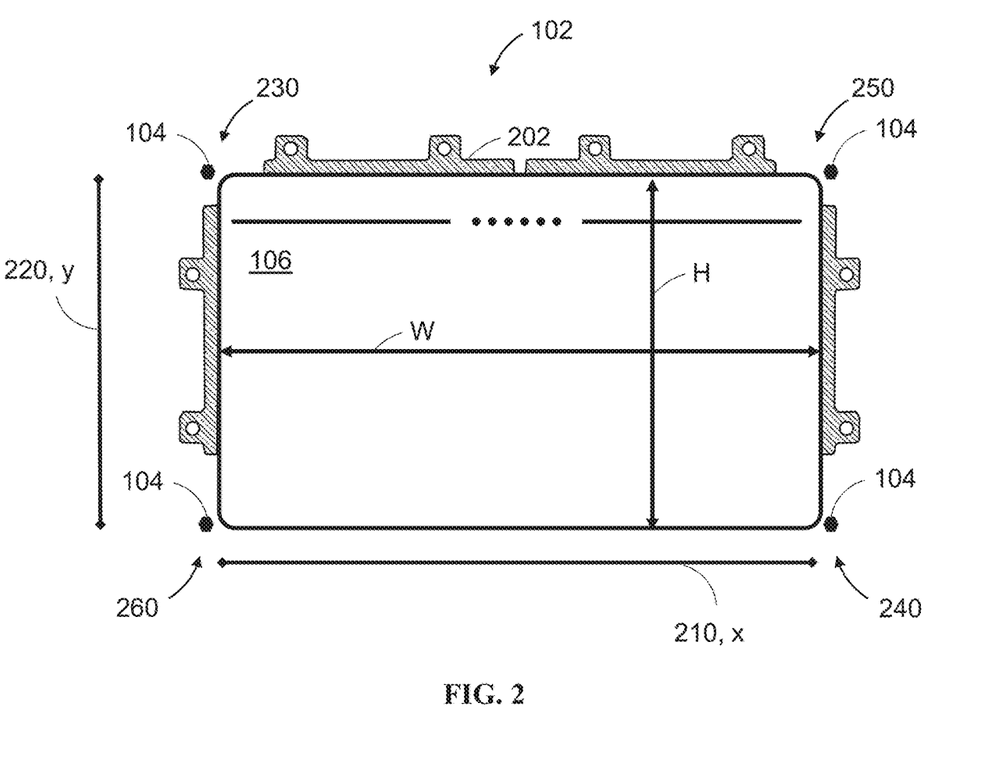
FIG. 2 depicts a touchpad in accordance with one or more embodiments of the disclosure.

FIG. 1 depicts a touchpad system (100) in accordance with one or more embodiments. The touchpad system (100) includes a touchpad (102) and a touch controller (110). The touchpad (102) is used to detect a touch, or contact, of a user. A touchpad (102) consistent with one or more embodiments is shown in FIG. 2. The touchpad (102) includes a surface with touch sensitivity. This surface is known as a touch sensor (106) or tactile surface. The touchpad (102) includes a mounting bracket (202). As depicted, the mounting bracket (202) can extend from the periphery of the touchpad (or, the touch sensor), either partially or totally, and possess one or more through-holes. The one or more through-holes can be used to align and/or attach the mounting bracket (202) with another system or device such as a computer system. Thus, the touchpad (102) can be integrated, both mechanically and electronically, with other systems or be considered a component of a larger system such as a computer system.

The touchpad (102) is characterized by a width (W) and a height (H). The width (W) and the height (H) can reference a width and height of the touch sensor (106). That is, the width (W) and height (H) of the touchpad (102) can be used to reference a point on the touch sensor (106) and need not span an area of the touchpad (102) that includes the mounting bracket (202).

A location on the touchpad (102), or, more specifically the touch sensor (106), can be referenced using a first reference axis (210) and a second reference axis (220). The first reference axis (210) can be an x axis and the second reference axis (220) can be a y axis arranged such that a location on the touch sensor (106) is specified using an x coordinate and a y coordinate (x-y coordinates). That is, the x coordinate and y coordinate can specify a location along the width (W) and height (H) of the touchpad (102), respectively (e.g., x coordinate within the range [0, W], y coordinate within the range [0, H]).

Various types of touch sensors (106) exist and can be used with the touchpad system (100) without departing from the scope of this disclosure. For example, the touch sensor (106) can be a resistive sensor, a capacitance sensor, or the like.

A resistive touch sensor detects pressure exerted by the user using either one or more of the user's fingers or an intermediary object such as a stylus. A resistive touch sensor typically consists of two plates positioned parallel with each other and separated by a small distance. Each plate is coated with circuitry such that depression of a plate resulting in contact with the other plate completes a circuit at the point of plate-to-plate contact.

Similarly, a capacitive touch sensor detects a user's touch by creating an electrostatic field along a conductive surface. Objects that conduct electricity or are otherwise dielectric such as a user's fingers can disturb the electrostatic field and reduce a measured capacitance at the point of contact.

Figure 3:
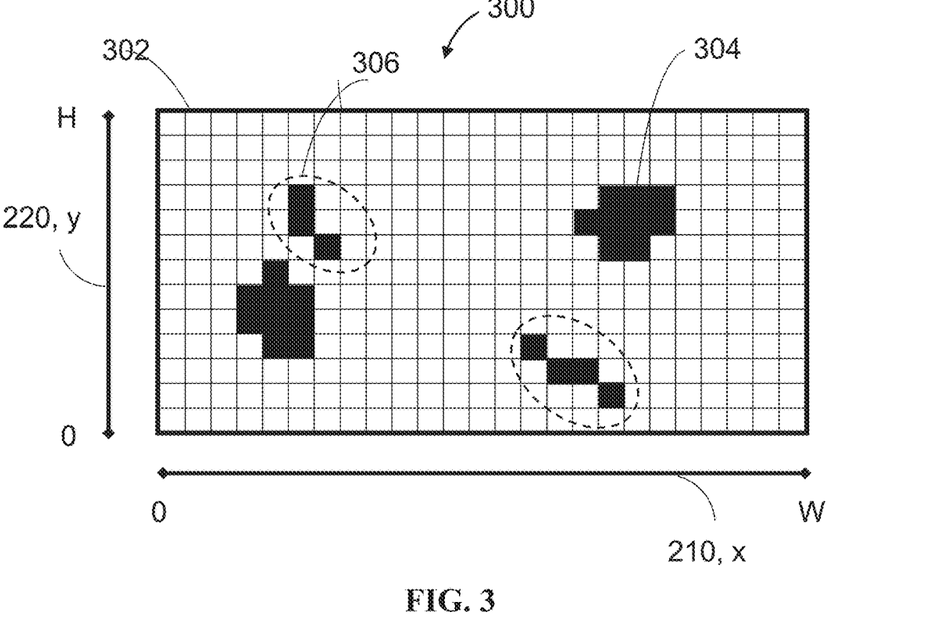
FIG. 3 depicts an example touch-based contact map in accordance with one or more embodiments of the disclosure.

Whether the touch sensor (106) is a resistive touch sensor, a capacitance touch sensor, or other type of touch sensor, the touch sensor (106) may be said to generate a touch signal that can be used to determine both the presence and location of a touch on the touchpad (102). In one or more embodiments, the touch signal is a touch-based contact map that indicates the strength of a measured value (e.g., capacitance) at discrete points over a discretized representation of the touchpad (102). An example of a touch-based contact map is depicted in FIG. 3, as described below. The discretized points of a touch-based contact map may be referred to as pixels. Further, a touch-based contact map can be formed for each instance in time. Thus, instances of touch-based contact maps can be referred to as frames.

Keeping with FIG. 1, and in accordance with one or more embodiments, the touchpad (102) further includes a plurality of force sensors (104). A force sensor need not directly measure a force, but can be configured to measure a related quantity such as strain or pressure. For example, a force sensor can contain a strain gauge bonded to a structure (e.g., metal structure) with a known cross-sectional area and modulus of elasticity to determine a force applied at the force sensor based on a relative elongation or displacement of the structure and strain gauge. Each force sensor in the plurality of force sensors (104) is configured to produce a continuous-valued output indicative of a force applied proximate the respective force sensor. The plurality of force sensors (104) are disposed along a perimeter of the touchpad (102) such that a measured force at each force sensor corresponds to a distance from, and strength of, a force applied to the touchpad (e.g., by a user's touch).

In FIG. 2 the four corners of the touchpad are labelled as a first corner (230), a second corner (240), a third corner (250), and a fourth corner (260). Further, in the example of FIG. 2, the plurality of force sensors (104) includes four force sensors, one at each corner (230, 240, 250, 260) of the touchpad (102). Additional or fewer force sensors can be used. For example, in some embodiments, the plurality of force sensors (104) consists of a first force sensor disposed at the first corner (230) and a second force sensor disposed at the second corner (240), where, as depicted in FIG. 2, the first corner (230) and the second corner (240) are opposing corners relative to the width (W) and height (H) of the touchpad (102).

Figure 4:
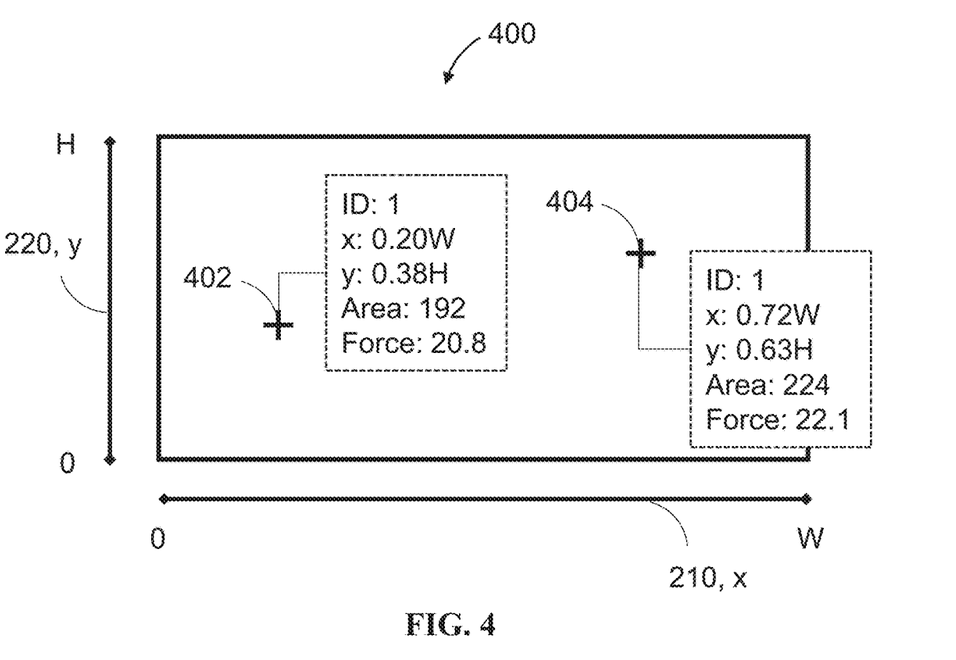
FIG. 4 depicts an example force-based contact map in accordance with one or more embodiments of the disclosure.

Measurements of force, or other related quantity, from the plurality of force sensors (104) can be combined, or otherwise processed, to generate a force signal that can be used to determine both the presence and location of a touch or contact on the touchpad (102). In one or more embodiments, the presence and location of a touch based on a force signal is represented as force-based contact map. An example of a forced-based contact map is depicted in FIG. 4, as described below. Similar to the touch-based contact map, a force-based contact map can be formed for each instance in time.

As stated, the touchpad system (100) further includes a touch controller (110). The touch controller (110) includes one or more computer processors (112) and data storage (114) such as one or more of a non-persistent storage (e.g., volatile memory, such as random access memory (RAM), cache memory) and a persistent storage (e.g., a hard disk, an optical drive such as a compact disk (CD) drive or digital versatile disk (DVD) drive, a flash memory, etc.). The processor (112) may be part or all of an integrated circuit for processing instructions. For example, the processor (112) may be, or include one or more cores or micro-cores. The touch controller (110) further includes a communication interface (not depicted), which may include an integrated circuit for connecting to a network (not shown) (e.g., a local area network (LAN), a wide area network (WAN) such as the Internet, mobile network, or any other type of network) and/or to another device, such as a computer system.

In accordance with one or more embodiments, the touch controller (110) receives a touch signal and force signal from the touchpad (102) using the touch sensor (106) and plurality of force sensors (104), respectively. The touch controller (110) processes the touch signal and the force signal to determine a contact position (150), where the contact position (150) can represent both the presence and location of a user touch on the touchpad (102). A contact position (150) can be determined for instances in time such that a plurality of contact positions can represent both the presence and motion of a user's touch over a period. FIG. 1 depicts the transmission of the determined contact position (150) to another system such as a computer system where the computer system can be external to the touchpad system (100) or include the touchpad system (100).

In some embodiments, the touchpad system (100) is used with a computer system, for example, as an input device of the computer system. The touchpad system (100) can be associated with a computer system by inclusion in the computer system or in electrical communication with the computer system. Thus, a contact position (150) or collection of contact positions (150) can be transformed to a command of the computer system. For example, the command can manipulate the position of a cursor of the computer system where the cursor is a virtual object or pointer represented on a computer screen as part of a graphical user interface.

A computer system, as referenced herein, is intended to encompass any computing device such as a server, desktop computer, laptop computer, smart phone, personal data assistant (PDA), tablet computing device, one or more processors within these devices, or any other suitable processing device, including both physical or virtual instances (or both) of the computing device. The computer system can include one or more auxiliary devices, for example, to receive inputs and process or display outputs. Auxiliary devices can include a keypad, keyboard, touch screen, or other input device that can accept user information (e.g., joystick). Auxiliary devices can further include a computer screen or other output device that conveys information associated with the operation of the computer system, including digital data, visual, or audio information (or a combination of information), or a graphical user interface. Thus, in some instances, a computer system includes a touchpad.

A computer system includes one or more computer processors and data storage such as one or more of a non-persistent storage (e.g., volatile memory, such as random access memory (RAM), cache memory) and a persistent storage (e.g., a hard disk, an optical drive such as a compact disk (CD) drive or digital versatile disk (DVD) drive, a flash memory, etc.). The processor may be part or all of an integrated circuit for processing instructions. For example, the processor may be or include one or more cores or micro-cores. The computer system can further include a communication interface, which may include an integrated circuit for connecting to a network (e.g., a local area network (LAN), a wide area network (WAN) such as the Internet, mobile network, or any other type of network) and/or to another device.

In some embodiments, the processor (112) and data storage (114) of the touch controller (110) are the same as at least one processor and data storage of a computer system. That is, in instances where the touchpad (102) of FIG. 1 is used in or with a computer system, the touch controller (110) may be encompassed, in terms of hardware and/or functionality, by the computer system.

Figure 6:
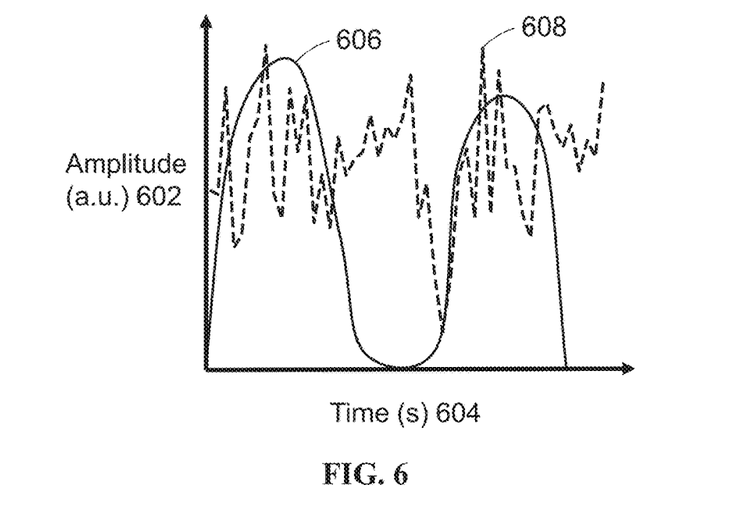
FIG. 6 depicts a force signal and noise at a point on a touchpad in accordance with one or more embodiments of the disclosure.

FIG. 3 depicts an example touch-based contact map (300) generated using a touch signal from the touch sensor (106). The touch-based contact map (300) is spatially related to the touchpad (102) as depicted with respect to the first reference axis (210) and second reference axis (220). Further, the touch-based contact map (300) is discretized forming pixels. In FIG. 3, pixels that have been filled in correspond to regions of the touch sensor (106) with measured values that indicate the presence of a touch. For example, pixel shade can represent the strength of a measured value (e.g., capacitance) at discrete points over a discretized representation of the touchpad (102). In the example of FIG. 6, the pixels have a binary state indicative of a touch (filled in) or not a touch (empty). Pixels of a touch-based contact map (300) can be binarized by comparing the measured value at the pixel (e.g., capacitance) to a predefined threshold.

FIG. 3 depicts two regions, namely, first touch region (302) and a second touch region (304), that correspond with actual touches at the touchpad (102). That is, a user may contact the touchpad (102) at more than one location simultaneously (e.g., multi-finger, gestures, etc.). FIG. 3 also depicts erroneous regions (306) where a touch is determined to present without an actual touch at those regions. The erroneous regions (306) may be caused by noise in the touch signal.

FIG. 4 depicts an example force-based contact map (400) generated using a force signal from the plurality of force sensors (104). In FIG. 4, the force signal has been evaluated and two points of contact have been determined, namely, a first point of contact (402) and a second point of contact (404). The points of contact each include spatial information (e.g., an x coordinate and a y coordinate) representative of the respective location on the touchpad (102) (or touch sensor (106)) where the respective touch is present. Using this spatial information, the points of contact (402, 404) can be displayed graphically as in FIG. 4. In one or more embodiments, each point of contact includes additional information such as a unique identifier ("ID"), a touch area, and a contact force ("force"). The touch area specifies the determined size or footprint of the touch proximate the point of contact. The touch area may be specified in pixels to be directly relatable to the touch-based contact map. The contact force specifies the force applied (e.g., Newtons) at the point of contact as determined using the plurality of force sensors (104).

Figure 5:
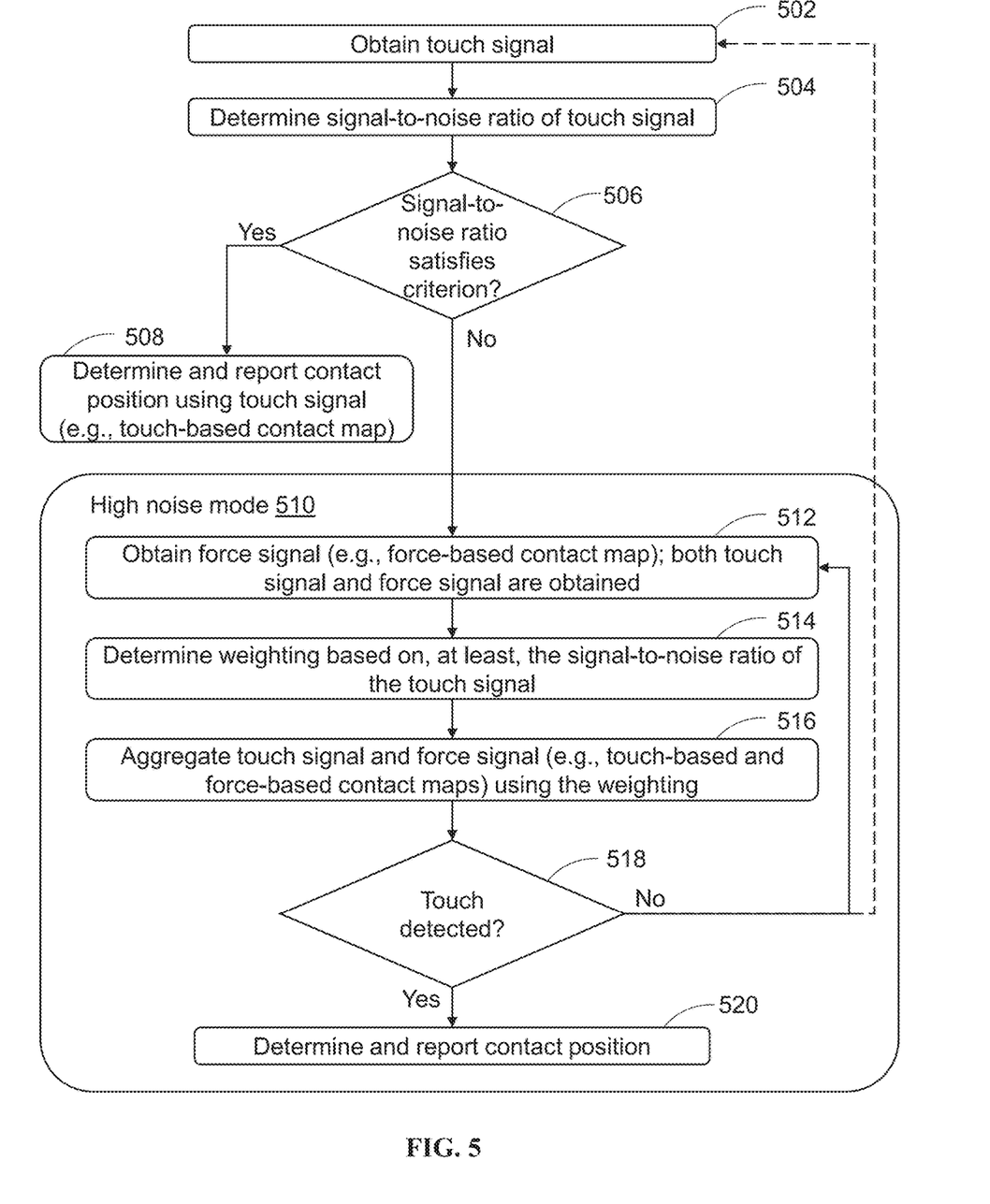
FIG. 5 depicts a flowchart in accordance with one or more embodiments of the disclosure.

FIG. 5 depicts a flowchart for determining whether a high noise scenario is present and, if so, acquiring a force signal from a plurality of force sensors (104) included in the touchpad (102), in addition to the touch signal, to determine a contact position (i.e., presence and location of a touch). The blocks of FIG. 5 can be performed using the touch controller (110). In Block 502, a touch signal is obtained from the touch sensor (106) of the touchpad (102). In some embodiments, the touch signal is evaluated using the touch controller (110) for pattern recognition to identify touch shapes and movements, helping differentiate valid inputs from random noise.

In Block 504, the touch signal is analyzed (e.g., in view of the determined patterns and/or prior movements) to determine a signal-to-noise ratio of the touch signal. In general, the signal-to-noise ratio quantifies the strength of the touch signal (or change in the touch signal) due to an actual touch and noise that may conceal or falsely indicate a touch.

Various factors can affect the characteristics of noise at a touch sensor (106). The level (or other descriptor such as variance) of noise at one or more portions of a touchpad (102) can depend on the presence moisture (e.g., ambient humidity), power fluctuations, static electricity, ambient temperatures, vibrations, contamination, and electromagnetic (EMI) and radio frequency interference (RFI), etc. Thus, a touch sensor (106) may encounter high noise scenarios in which the associated touch sensor cannot reliably determine a user's touch and/or generate an accurate contact position.

In Block 506, the signal-to-noise ratio of the touch signal is evaluated based on a criterion. The criterion is satisfied if the signal-to-noise ratio indicates that contact positions of a touch at the touchpad (102) can be determined using the touch signal. In one or more embodiments, the criterion consist of a signal-to-noise threshold, where the criterion is satisfied if the signal-to-noise ratio exceeds the signal-to-noise threshold. In an example, the touch controller (110) checks the touch signal across scanning frequencies and if noise readings exceed a threshold on all frequencies (or the signal-to-noise ratio is less than a threshold) the criterion is not satisfied. If, in Block 506, the criterion is satisfied (i.e., satisfactory signal-to-noise ratio), then the flowchart proceeds to Block 508. In Block 508, the contact position (presence and location of a touch) is determined using the touch signal, for example, by forming or using a touch-based contact map. While not depicted, after Block 508 the flowchart can return to Block 502. That is, the flowchart of FIG. 5 can be run or executed continuously (e.g., in a loop) to determine contact positions at a touchpad (102) in real time.

If, in Block 506, the criterion is not satisfied (i.e., high noise, low signal-to-noise ratio) then a high noise mode (510) is initiated and the flowchart proceeds to Block 512. The high noise mode (510) encompasses, or is effectuated, by Blocks 512 to 520. That is, the steps of FIG. 5 represent a method for determining whether a high noise scenario is present and, if so, for determining a contact position in the presence of the noise using the touchpad system (100).

Continuing with FIG. 5, in Block 512 (the first block in the high noise mode (510)), a force signal is obtained from the plurality of force sensors (104). In some instances, the force signal is represented as a force-based contact map. As discussed, the plurality of force sensors (104) includes multiple force sensors (e.g., four to ten force sensors, but may be as few as two) surrounding the touchpad (102), and the force-based contact map is determined by the differences in the values detected by each force sensor.

Notably, the touch signal (or the touch-based contact map) is already obtained in Block 502. Thus, upon executing Block 512 both the touch signal and the force signal (or both the touch-based contact map and the force-based contact map) have been obtained.

In Block 514, a weighting is determined. The weighting specifies the relative importance of the touch signal and the force signal in determining a contact position. The weighting is based on, at least, the signal-to-noise ratio of the touch signal. For example, in one or more embodiments, the high noise mode (510) is entered upon determining that the signal-to-noise ratio of the touch signal is less than a signal-to-noise threshold (Blocks 504 and 506). Representing the signal-to-noise ratio of the touch signal as SNR and the signal-to-noise threshold as α, in these embodiments, the output condition of Block 506 ("condition") can be written mathematically as $$\text{condition} = \begin{cases} \text{True} & \text{SNR} > \alpha \\ \text{False} & \text{otherwise} \end{cases}.$$

As such, the signal-to-noise ratio of the touch signal referenced in Block 514 is known to have an upper limit of α (the signal-to-noise threshold) and a lower limit of zero (e.g., by truncation in instances where the touch signal is non-positive). Thus, an example weighting uses a ratio of the signal-to-noise ratio and the signal-to-noise threshold $$\left(\text{e.g.,} \frac{SNR}{\alpha}\right).$$

Various example weightings are shown below in discussion of Block 516. The weighting is used to aggregate the touch signal and the force signal and can also define a functional relationship for its use. In one or more embodiments, the weighting is further based on a signal-to-noise ratio of the force signal. As an example, determining the weighting of the touch signal and the force signal can include assigning a higher weight to the higher signal—touch signal or force signal—corresponding to the higher of the signal-to-noise ratio of the touch signal and the signal-to-noise ratio of the force signal.

In Block 516 the touch signal and the force signal (e.g., the touch-based contact map and the force-based contact map) are aggregated using the weighting. That is, the weighting can include one or more weights and a function or logic sequence for aggregating the touch signal and the force signal. Returning to a weighting that uses the ratio of the signal-to-noise ratio and the signal-to-noise threshold $$\left(\text{i.e.,} \frac{SNR}{\alpha}\right)$$

an example aggregation of the touch and force signal though summation is $$\text{aggregate signal} = \left(\frac{SNR}{\alpha}\right) \text{touch signal} + \left(1 - \frac{SNR}{\alpha}\right) \text{force signal}.$$

In another example, the weighting is further based on a signal-to-noise ratio of the force signal. Considering the signal-to-noise ratio of the touch signal as $SNR_t$ and the signal-to-noise ratio of the force signal as $SNR_f$, an aggregation of the touch signal and force signal is given as $$\text{aggregate signal} = \left(\frac{\exp(SNR_t)}{\exp(SNR_t) + \exp(SNR_f)}\right)\text{touch signal} + \left(\frac{\exp(SNR_f)}{\exp(SNR_c) + \exp(SNR_f)}\right)\text{force signal},$$

where the parenthetical expressions represent a "softmax" weighting based on the signal-to-noise ratio of the touch signal and the signal-to-noise ratio of the force signal.

Other weightings and aggregation implementations can be used without departing from the scope of this disclosure. As stated, the weighting indicates the relative importance of the touch signal and force signal in their aggregation, where the aggregation can be a summation, average, or other logical sequence (e.g., a programmed use of the touch signal and force signal).

In Block 518, the aggregated touch and force signals are evaluated to determine if a touch is detected (i.e., a positive touch presence or contact). In one or more embodiments, the aggregated touch and force signals are compared to a predefined confidence threshold. If the aggregated touch and force signals are higher than the confidence threshold then a touch is detected. In one or more implementations, the aggregated touch and force signals can be viewed as a contact map, i.e., possessing a value or signal at various spatial locations on the touchpad (102). In such cases, one or more portions of the aggregated touch and force signals can exceed the confidence threshold indicative of one or more regions where a touch is detected. If, in Block 518, no touch is detected, the flowchart can return to Block 512. In some instances, a null contact position is returned indicating that no touch is detected. By returning to Block 512 the flowchart implements a loop to detect a touch at the touchpad (102) and determine a contact position. In returning to Block 512, an updated touch signal (i.e., current) may be newly obtained with an updated force signal. Alternatively, and as depicted with the dashed directed arrow in FIG. 5, if no touch is detected in Block 518 the flowchart can return to Block 502. That is, in a first behavior where, when no touch is detected in Block 518 the flowchart proceeds to Block 512, the high noise mode (510) is maintained. And, in a second behavior where, when no touch is detected in Block 518 the flowchart proceeds to Block 502, the high noise mode (510) is exited. determine contact positions at a touchpad (102) in real time. In some embodiments, both the first behavior and the second behavior are implemented. For example, upon entering the high noise mode (510), the high noise mode (510) can be maintained for a predefined duration or number of iterations of loops of the flowchart of FIG. 5. Thus, a check for the high noise mode (510) can be performed according to a given periodicity.

If, in Block 518, a touch is detected, the flowchart proceeds to Block 520. In Block 520 a contact position is determined and reported in view of the touch signal, force signal, and weighting (e.g., aggregate signal). While not depicted, after Block 520 the flowchart can return to Block 502 (or Block 512 depending on the implemented behavior). That is, the flowchart of FIG. 5 can be run or executed continuously (e.g., in a loop) to determine contact positions at a touchpad (102) in real time.

In accordance with one or more embodiments, a summary of the steps of the high noise mode (510) (i.e., Blocks 512-520) is given as follows. Upon determining a sufficient difference between an expected touch signal in the presence of a touch and a noise-affected touch signal in the presence of a touch (or, in other words, a low signal-to-noise ratio of the touch signal), where this difference may be said to satisfy a criterion (i.e., a sufficient difference is defined by the criterion), a force signal is aggregated with the touch signal to detect a touch. The touch is detected by comparing the aggregated touch and force signals with a confidence threshold. In one or more embodiments, during aggregation, the force signal is multiplied by a coefficient based on the determine signal-to-noise ratio of the force signal. Thus, when the aggregated signal (or a portion or region of the aggregated signal) is larger than the confidence threshold, a touch is detected and reported, for example, to another system.

FIG. 6 depicts an example of noise with respect to the touch signal at a point on the touchpad (102). As stated, the touchpad (102) can be discretized into a set of points and each discrete point can output a value that, if collected over a period as a series, forms a touch signal for the respective discrete point. As such, the touch signal can include a first touch signal for a first point of the touchpad (102), a second touch signal for a second point of the touchpad (102), and so on and so forth for all the discretized points of the touchpad (102). In practice, a measured touch signal for a discrete point will consist of (or be the sum of) an actual, or true, signal and noise.

FIG. 6 depicts the amplitude (602) of an example true first touch signal (606) over time (604). The true first touch signal (606) represents an actual, or true, value (e.g., capacitance) at a first point on the touchpad (102). FIG. 6 also depicts a first noise signal (608) that is present at the first point on the touchpad (102). In the example of FIG. 6, the first noise signal (608) has a variance (and bias) such that, if added or combined with the true first touch signal (606) will, if directly evaluated, conceal the true first touch signal (606) or cause a false detection event. That is, FIG. 6 represents a "high noise" scenario where it is difficult to determine a touch based on the measured touch signal at the first point.

Conventionally, in a high noise scenario, a touch signal is aggregated (e.g., averaged) over multiple frames (i.e., a period of time) to reduce the noise in the touch signal. A disadvantage of these techniques is that they can fail to capture transient signals, for example, originating from the motion of a user's touch. A depiction of this behavior is shown in FIG. 7.

Figure 7:
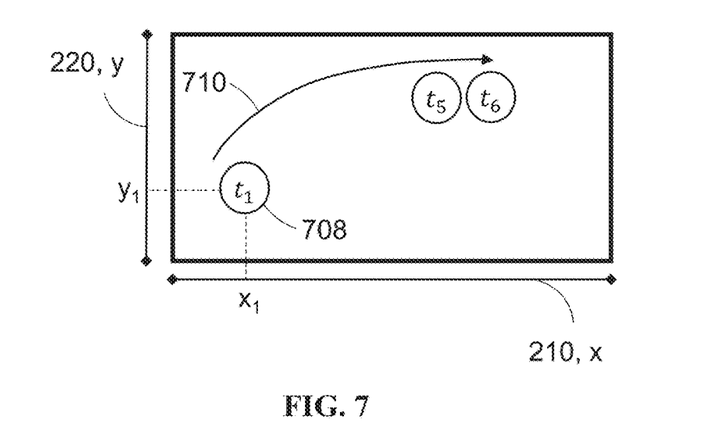
FIG. 7 depicts determined contact positions intended to represent a motion of a user touch using a conventional technique.

FIG. 7 depicts contact positions determined over a period of time in a high noise scenario using a conventional technique. FIG. 7 illustrates the surface of a touchpad with reference axes (210, 220). Non-null contact positions are displayed at their respective locations on the touchpad. The time associated with the non-null contact position is displayed as $t_i$, where i is an index. For example, FIG. 7 depicts a first contact position (708) having a position $x_1$, $y_1$ at a time $t_1$. For FIG. 7 it is stated that a user contacts the touchpad over a period bounded by times $t_1$ and $t_6$ with a single finger and moves the finger in the depicted motion (710). As depicted, although the user is touching the touchpad at times $t_2$, $t_3$, and $t_4$, no touch is detected (i.e., null contact positions). Determined non-null contact positions $t_1$, $t_5$, and $t_6$ do not correctly capture the motion (710) of the user's touch and, if reported to or used by another system such as a computer system to control a cursor can result in erroneous behavior such as cursor lag or jump.

Figure 8:
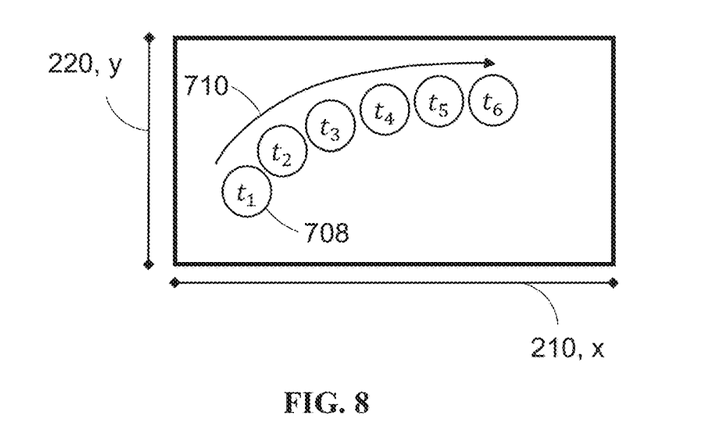
FIG. 8 depicts determined contact positions in a high noise scenario in accordance with one or more embodiments of the disclosure.

FIG. 8 depicts contact positions determined over a period of time in a high noise scenario using the touchpad system (100) and method of use as described herein. As depicted, even in the presence of noise, non-null contact positions at times $t_1$ though $t_7$ are accurately determined capturing the motion (710). Consequently, if reported to or used by another system such as a computer system to control a cursor, the cursor will behave as expected by the user.

Figure 9:
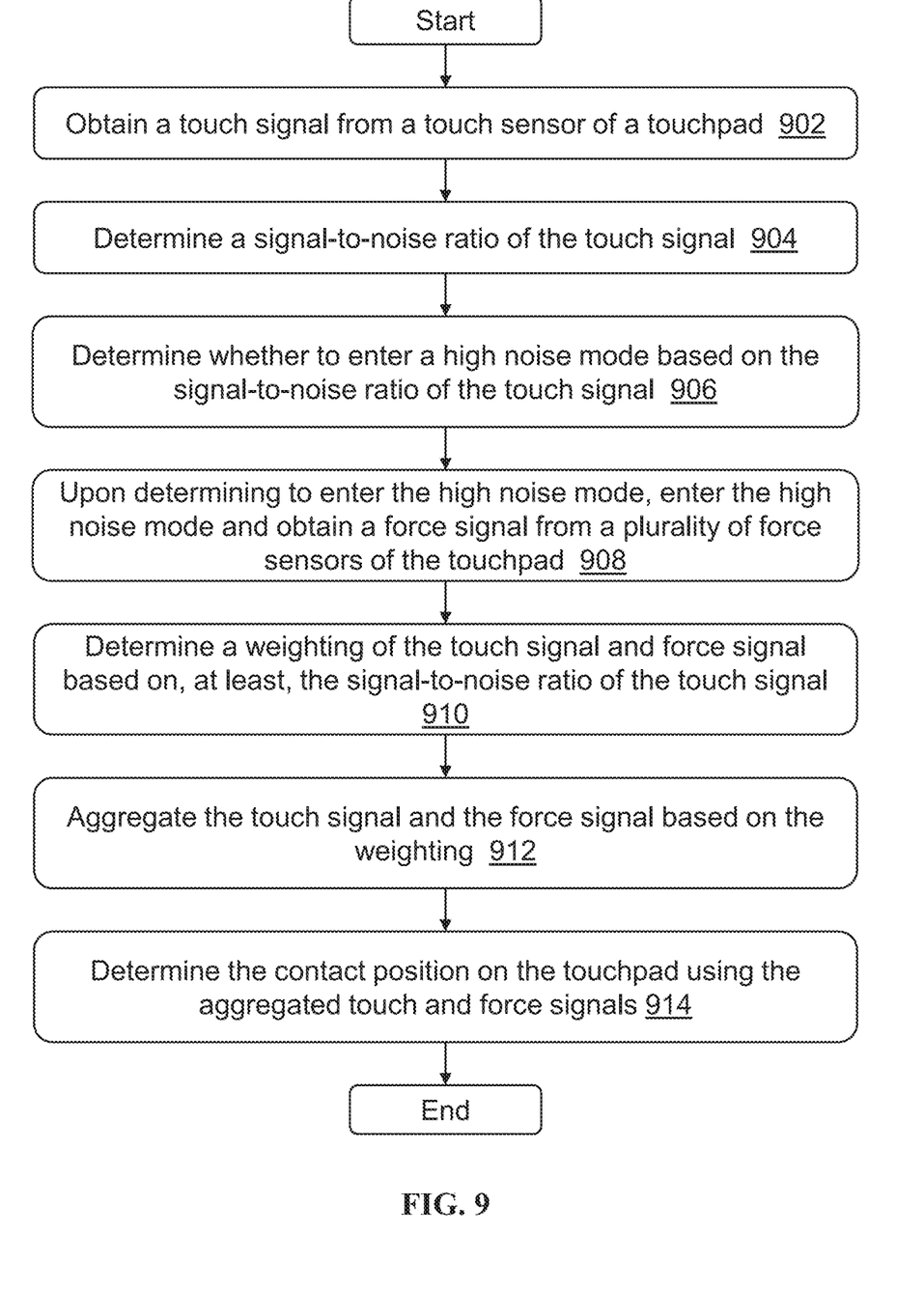
FIG. 9 depicts a method for determining a contact position on a touchpad in accordance with one or more embodiments of the disclosure.

FIG. 9 depicts a method in accordance with one or more embodiments. The steps of the method of FIG. 9 can be performed using a touch controller (110) of a touchpad system (100) as previously described. As depicted, in Step 902 a touch signal is obtained from a touchpad (102). In some embodiments, the touch signal is, or is represented as, a touch-based contact map. In Step 904 a signal-to-noise ratio of the touch signal is determined. In one or more embodiments, the touch signal is scanned across all relevant frequencies and compared to noise readings to determine a signal-to-noise ratio at each frequency. In Step 906 it is determined whether to enter a high noise mode based on the signal-to-noise ratio of the touch signal. In one or more embodiments, this determination is made using a criterion. For example, if the criterion is not satisfied the high noise mode is entered. The criterion can include a signal-to-noise threshold. For example, the high noise mod can be entered upon determining that the signal-to-noise ratio is less than the signal-to-noise threshold.

Continuing with FIG. 9, in Step 908 upon determining to enter the high noise mode, the high noise mode is entered and a force signal is obtained. The force signal is obtained or constructed from the force measurements of a plurality of force sensors (104) of the touchpad (102). In some instances, the force signal is represented as a force-based contact map. In Step 910 a weighting of the touch signal and the force signal is determined based on, at least, the signal-to-noise ratio of the touch signal. In one or more embodiments, the weighting is further based on a signal-to-noise ratio of the force signal. The weighting specifies the relative importance of the touch signal and the force signal in determining a contact position. In one or more embodiments, determining the weighting of the touch signal and the force signal includes determining a signal-to-noise ratio of the force signal (in addition to the already determined signal-to-noise ratio of the touch signal), and assigning a higher weight to the higher of the signal-to-noise ratio of the touch signal and the signal-to-noise ratio of the force signal.

In Step 912 the touch signal and the force signal are aggregated based on the weighting. Various weightings and aggregation implementations can be used without departing from the scope of this disclosure. For example, the weighting and aggregation can specify that a contact position determined by the force signal (e.g., using a force-based contact map) should be given greater confidence than a contact position determined using the touch signal. In Step 914, a contact position is determined using the aggregated touch and force signals. In other words, the contact position is determined using both the touch and force signals where these signals are aggregated or otherwise considered in view of the weighting (e.g., confidence in each signal is considered). The contact position can include both an indication of the presence of a touch and the location of a detected touch. That is, the contact position can be null indicating that no touch is detected. In this way, determination of a contact position can include both tasks of detecting a touch and determining its location if these tasks are considered separate. Further, the contact position can include the presence and location of more than one concurrent touch (e.g., multi-finger, gestures, etc.). The method of FIG. 9 can be executed repeatedly (e.g., in a loop) to determine contact position(s) in real time. In one or more embodiments, the contact position (including touch detection) is determined by comparing the aggregated touch and force signals (i.e., aggregated signal) to a predefined confidence threshold. For example, in one or more embodiments, one or more portions of the aggregated signal greater than the confidence threshold represent one or more regions of a detected touch, where a position of each touch can be determined, for example, as the centroid of each region.

Embodiments of the disclosure have one or more of the following advantages. Embodiments of the disclosure may provide real-time and highly accurate contact positions and/or touch detection of a touch at a touchpad, even in the presence of noise. This determination is made based on an evaluation of the signal-to-noise ratio of a touch signal of the touchpad without need to consider the factors that contributed to the noise (e.g., temperature, vibration, moisture, etc.). In accordance with one or more embodiments, a determination of whether to enter a high noise mode is made. In response to entering the high noise mode, due to the determined presence of noise, a force signal is evaluated in addition to a touch signal to detect a touch and determine a contact position. Embodiments of the disclosure are applicable to touchpad detection scenarios involving more than one concurrent contact or touch at the touchpad (i.e., multi-finger) and for capturing movement of a touch (e.g., gestures).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A touchpad system, comprising:
a touchpad comprising a plurality of force sensors and a touch sensor; and
a touch controller in electrical communication with the touchpad and configured to:
obtain a touch signal from the touch sensor,
determine a signal-to-noise ratio of the touch signal,
cause the touchpad system to enter a high noise mode based on the signal-to-noise-ratio of the touch signal,
obtain a force signal from the plurality of force sensors,
determine a weight of the touch signal and a weight of the force signal based on the signal-to-noise ratio of the touch sensor,
aggregate the touch signal and force signal by summing the touch signal and force signal multiplied by their respective weights,
determine a contact position of a user touch on the touchpad using the aggregated touch and force signals, and
transmit the contact position to a computer system.

2. The touchpad system according to claim 1, wherein the touch sensor is a capacitance sensor.

3. The touchpad system according to claim 1, wherein the plurality of force sensors comprises:
a first force sensor proximate a first corner of the touchpad; and
a second force sensor proximate a second corner of the touchpad,
the first corner and the second corner are opposing corners relative a width and a height of the touchpad.

4. The touchpad system according to claim 1, wherein the touch controller is further configured to:
  execute a command to manipulate a cursor of the computer system based on the contact position.

5. The touchpad system according to claim 1, wherein the touch controller causes the touchpad system to enter the high noise mode by determining that the signal-to-noise ratio of the touch signal satisfies a criterion.

6. The touchpad system according to claim 1, wherein the touch controller determines the weighting of the touch signal and the force signal by:
  determining a signal-to-noise ratio of the force signal, and
  assigning a higher weight to the higher of the signal-to-noise ratio of the touch signal and the signal-to-noise ratio of the force signal.

7. A method for determining a contact position on a touchpad of a touchpad system, the method comprising:
  obtaining a touch signal from a touch sensor of the touchpad;
  determining a signal-to-noise ratio of the touch signal;
  causing the touchpad system to enter a high noise mode based on the signal-to-noise-ratio of the touch signal;
  obtaining a force signal from a plurality of force sensors of the touchpad;
  determining a weight of the touch signal and a weight of the force signal based on the signal-to-noise ratio of the touch sensor;
  aggregating the touch signal and force signal by summing the touch signal and the force signal multiplied by their respective weights; and
  determining the contact position on the touchpad using the aggregated touch and force signals.

8. The method according to claim 7, wherein the touch sensor is a capacitance sensor.

9. The method according to claim 7, wherein the plurality of force sensors comprises:
  a first force sensor proximate a first corner of the touchpad; and
  a second force sensor proximate a second corner of the touchpad,
  the first corner and the second corner are opposing corners relative a width and a height of the touchpad.

10. The method according to claim 7, further comprising:
  transmitting the contact position to a computer system, and
  executing a command to manipulate a cursor of the computer system based on the contact position.

11. The method according to claim 7, wherein causing the touchpad system to enter the high noise mode comprises determining that the signal-to-noise ratio of the touch signal satisfies a criterion.

12. The method according to claim 7, wherein determining the weighting of the touch signal and the force signal comprises:
  determining a signal-to-noise ratio of the force signal, and
  assigning a higher weight to the higher of the signal-to-noise ratio of the touch signal and the signal-to-noise ratio of the force signal.

13. A computer system, comprising:
  a touchpad system comprising a plurality of force sensors and a touch sensor; and
  a non-transitory computer-readable medium comprising computer-executable instructions that, when executed on a computer processor, cause the processor to perform:
    obtaining a touch signal from the touch sensor,
    determining a signal-to-noise ratio of the touch signal,
    causing the touchpad system to enter a high noise mode based on the signal-to-noise-ratio of the touch signal,
    obtaining a force signal from the plurality of force sensors,
    determining a weight of the touch signal and a weight of the force signal based on the signal-to-noise ratio of the touch sensor,
    aggregating the touch signal and force signal by summing the touch signal and the force signal multiplied by their respective weights,
    determining a contact position of a user touch on the touchpad using the aggregated touch and force signals, and
    manipulating a cursor of the computer system based on the contact position.

14. The system according to claim 13, wherein the touch sensor is a capacitance sensor.

15. The system according to claim 13, wherein the plurality of force sensors comprises:
  a first force sensor proximate a first corner of the touchpad; and
  a second force sensor proximate a second corner of the touchpad,
  the first corner and the second corner are opposing corners relative a width and a height of the touchpad.

16. The system according to claim 13, wherein causing the touchpad system to enter the high noise mode comprises determining that the signal-to-noise ratio of the touch signal satisfies a criterion.

17. The system according to claim 13, wherein determining the weighting of the touch signal and the force signal comprises:
  determining a signal-to-noise ratio of the force signal, and
  assigning a higher weight to the higher of the signal-to-noise ratio of the touch signal and the signal-to-noise ratio of the force signal.

* * * * *